United States Patent
Shih et al.

(10) Patent No.: US 11,006,441 B2
(45) Date of Patent: May 11, 2021

(54) METHOD AND APPARATUS OF PREVENTING BANDWIDTH PART MISALIGNMENT IN A WIRELESS COMMUNICATION SYSTEM

(71) Applicant: ASUSTek Computer Inc., Taipei (TW)

(72) Inventors: Tun-Huai Shih, Taipei (TW); Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 142 days.

(21) Appl. No.: 16/138,063

(22) Filed: Sep. 21, 2018

(65) Prior Publication Data

US 2019/0098655 A1 Mar. 28, 2019

Related U.S. Application Data

(60) Provisional application No. 62/562,095, filed on Sep. 22, 2017.

(51) Int. Cl.
*H04W 4/00* (2018.01)
*H04W 72/12* (2009.01)
(Continued)

(52) U.S. Cl.
CPC ...... *H04W 72/1284* (2013.01); *H04B 7/0617* (2013.01); *H04B 7/0695* (2013.01);
(Continued)

(58) Field of Classification Search
CPC ......... H04W 72/1284; H04W 72/0413; H04W 72/0453; H04W 72/1268; H04W 74/0833;
(Continued)

(56) References Cited

U.S. PATENT DOCUMENTS

2014/0004898 A1* 1/2014 Yu .................. H04B 7/0695
455/510
2017/0048736 A1 2/2017 Marinier
(Continued)

FOREIGN PATENT DOCUMENTS

WO WO-2017024516 A1 * 2/2017 ............. H04B 7/088
WO 2018031327 2/2018
(Continued)

OTHER PUBLICATIONS

Huawei (R1-1715468, Beam failure recovery Design Details, Sep. 18-21, 2017). (Year: 2017).*
(Continued)

*Primary Examiner* — Maharishi V Khirodhar
(74) *Attorney, Agent, or Firm* — Cooper Legal Group, LLC

(57) ABSTRACT

A method and apparatus are disclosed from the perspective of a UE (User Equipment). In one embodiment, the method includes transmitting a Scheduling Request (SR) on a first uplink bandwidth part (BWP). The method further includes receiving a response for the SR on a first downlink BWP. The method also includes detecting a beam failure when using the first uplink BWP and the first downlink BWP. In addition, the method includes transmitting a beam failure recovery (BFR) request to a network node on the first uplink BWP. Furthermore, the method includes receiving a control signalling on a second downlink BWP from the network node after transmitting the BFR request, wherein the control signalling is a response for the BFR request and the second downlink BWP is associated with the first uplink BWP.

20 Claims, 12 Drawing Sheets

(51) Int. Cl.
<table>
<tr><td>H04B 7/08</td><td>(2006.01)</td></tr>
<tr><td>H04B 7/06</td><td>(2006.01)</td></tr>
<tr><td>H04L 5/00</td><td>(2006.01)</td></tr>
<tr><td>H04W 72/04</td><td>(2009.01)</td></tr>
<tr><td>H04W 74/08</td><td>(2009.01)</td></tr>
</table>

(52) U.S. Cl.
CPC ........... *H04B 7/088* (2013.01); *H04L 5/0048* (2013.01); *H04W 72/0413* (2013.01); *H04W 74/0833* (2013.01); *H04W 72/1278* (2013.01)

(58) Field of Classification Search
CPC . H04W 28/0278; H04B 7/088; H04B 7/0659; H04B 7/0617; H04L 5/0048
See application file for complete search history.

(56) References Cited

U.S. PATENT DOCUMENTS

<table>
<tr><td>2018/0124687</td><td>A1</td><td>5/2018</td><td>Park et al.</td><td></td></tr>
<tr><td>2018/0219604</td><td>A1*</td><td>8/2018</td><td>Lu</td><td>.................. H04L 1/1607</td></tr>
<tr><td>2018/0324865</td><td>A1*</td><td>11/2018</td><td>Hui</td><td>.................. H04B 7/088</td></tr>
<tr><td>2018/0367374</td><td>A1*</td><td>12/2018</td><td>Liu</td><td>.................. H04L 5/0053</td></tr>
<tr><td>2019/0037423</td><td>A1*</td><td>1/2019</td><td>Yu</td><td>.................. H04B 7/06</td></tr>
<tr><td>2019/0335522</td><td>A1*</td><td>10/2019</td><td>Zhang</td><td>.............. H04W 74/0833</td></tr>
</table>

FOREIGN PATENT DOCUMENTS

<table>
<tr><td>WO</td><td>2018031799</td><td>2/2018</td></tr>
<tr><td>WO</td><td>2018059399</td><td>5/2018</td></tr>
</table>

OTHER PUBLICATIONS

Media Tek, R1-1704465, Apr. 3-7, 2017, "discussion on beam recovery mechanism" (Year: 2017).*

NTT Docomo, R1-1702799, Feb. 13-17, 2017, "views on mechanism to recover from beam failure" (Year: 2017).*

Samsung, Sep. 18-21, R1-1716007, "procedure for UL Transmissions" (Year: 2017).*

Huawei, R1-1709929, Jun. 27-30m, 2017, "general views on beam failure recovery" (Year: 2017).*

Qualcomm ( Beam refinement after beam recovery or scheduling request, Berlin, Germany, Aug. 21-25, 2017, R2-1709090). (Year: 2017).*

Samsung, Beam failure recovery[online], 3GPP TSG RAN WG1 adhoc_NR_AH_1709 R1-1715941, Internet <URL:http://www.3gpp.org/ftp/tsg_ran/WG1_RL1/TSGR1_AH/NR_AH_1709/Docs/R1-1715941.zip>, Sep. 21, 2017.

ZTE, Supporting Multi-beam in NR-PDCCH[online], 3GPP TSG RAN WG1 adhoc_NR_AH_1706 R1-1710108, Internet <URL:http://www.3gpp.org/ftp/tsg_ran/WG1_RL1/TSGR1_AH/NR_AH_1706/Docs/R1-1710108.zip>, Jun. 30, 2017.

Qualcomm Incorporated, Beam refinement after beam recovery or scheduling request[online], 3GPP TSG RAN WG2 #99 R2-1709090, Internet, <URL:http://www.3gpp.org/ftp/tsg_ran/WG2_RL2/TSGR2_99/Docs/R2-1709090.zip>, Aug. 25, 2017.

InterDigital, Inc., CORESET Monitoring Under Dynamic Change of BWP[online], 3GPP TSG RAN WG1 #90 R1-1714111, Internet, <URL:http://www.3gpp.org/ftp/tsg_ran/WG1_RL1/TSGR1_90/Docs/R1-1714111.zip>, Aug. 25, 2017.

Office Action from Japan Patent Office in corresponding JP Application No. 2018-176779, dated Sep. 3, 2019.

Huawei et al: "Beam Failure Recovery Design Details", 3GPP Draft; R1-1715468, 3rd Generation Partnership Project (3GPP), Mobile Competence Centre ; 650, Route Des Lucioles ; F-06921 Sophia-Antipolis Cedex ;France1 vol. RAN WG1, No. Nagoya, Japan; Sep. 18, 2017-Sep. 21, 2017,Sep. 17, 2017 (Sep. 17, 2017),XP051338936.

Mediatek Inc: "Discussion on beam recovery mechanism", 3GPP Draft, R1-1704465_Discussion_0n_Beam_Rec0very_Mechanis_Final, 3rd Generation Partnership Project (3GPP), Mobile Competence Centre ; 650, Route Des Lucioles ; F-06921 Sophia-Antipolis Cedex ; Fra vol. RAN WG1, No. Spokane, USA; Apr. 3, 2017-Apr. 7, 2017,Apr. 2, 2017 (Apr. 2, 2017).

Office Action from Taiwan Patent Office in corresponding TW Application No. 107133521, dated May 10, 2019.

Huawei et al: "Beam Failure Recovery Design Details", 3GPP Draft; R1-1715468, 3rd Generation Partnership Project (3GPP), Mobile Competence Centre ; 650, Route Des Lucioles ; F-06921 Sophia-Antipolis Cedex ;France1 vol. RAN WG1, No. Nagoya, Japan; Sep. 18, 2017-Sep. 21, 2017,Sep. 17, 2017.

Mediatek Inc: "Discussion on beam recovery mechanism", 3GPP Draft, R1-1704465_Discussion_0n_Beam_Rec0very_Mechnis_Final, 3rd Generation Partnership Project (3GPP), Mobile Competence Centre ; 650, Route Des Lucioles ; F-06921 Sophia-Antipolis Cedex ; Fra vol. RAN WG1, No. Spokane, USA; Apr. 3, 2017-Apr. 7, 2017,Apr. 2, 2017 (Apr. 2, 2017).

Qualcomm Incorporated: "On Multi-TRP and Multi-panel Transmission", 3GPP Draft; R1-1716392,3rd Generation Partnership Project (3GPP), Mobile Competence Centre ; 650, Route Des Lucioles ; F-06921 Sophia-Antipolis Cedex ; vol. RAN WG1, No. Nagoya, Japan; Sep. 18, 2017-Sep. 21, 2017 Sep. 17, 2017 (Sep. 17, 2017), XP051339847.

Communication pursuant to Article 94(3) EPC from corresponding EP Application No. 18195880.2, dated Sep. 6, 2019.

Huawei et al; "Beam Failure Recovery Design Details", 3GPP Draft; R1-1715468, 3rd Generation Partnership Project (3GPP), Mobile Competence Centre ; 650, Route Des Lucioles ; F-06921 Sophia-Antipolis Cedex ;France1 vol. RAN WG1, No. Nagoya, Japan; Sep. 18, 2017-Sep. 21, 2017,Sep. 17, 2017 (Sep. 17, 2017),XP051338936, Retrieved from the Internet: URL:http://www.3gpp.org/ftp/Meetings_3GPP SYNC/RAN1/Docs/, 3GPP Draft, [Sep. 18-21, 2017].

Mediatek Inc: "Discussion on beam recovery mechanism", 3GFP Draft, R1-1704465_Discussion_0n_Beam_Rec0very_Mechanis_Final, 3rd Generation Partnership Project (3GPP), Mobile Competence Centre ; 650, Route Des Lucioles ; F-06921 Sophia-Antipolis Cedex ; Fra vol. RAN WG1, No. Spokane, USA; Apr. 3, 2017-Apr. 7, 2017,Apr. 2, 2017 (Apr. 2, 2017), XP051242609, Retrieved from the Internet: https://www.3gpp.org/ftp/Meetings_3GPP_SYNC/RAN1/Docs [Apr. 3-7, 2017].

European Search Report from corresponding EP Application No. 18195880.2, dated Jan. 7, 2019.

Qualcomm Incorporated, R2-1709090, Beam refinement after beam recovery or scheduling request, 3GPP Server release date (Aug. 12, 2017).

Samsung, "Beam failure recovery", 3GPP TSG RAN WG1 Meeting NR#3, R1-1715941, Nagoya, Japan Sep. 18-21, 2017.

Office Action from Korean Intellectual Property Office in corresponding KR Application No. 10-2018-0113646, dated Apr. 7, 2020.

* cited by examiner

METHOD AND APPARATUS OF PREVENTING BANDWIDTH PART MISALIGNMENT IN A WIRELESS COMMUNICATION SYSTEM

CROSS-REFERENCE TO RELATED APPLICATIONS

The present Application claims the benefit of U.S. Provisional Patent Application Ser. No. 62/562,095 filed on Sep. 22, 2017, the entire disclosure of which is incorporated herein in its entirety by reference.

FIELD

This disclosure generally relates to wireless communication networks, and more particularly, to a method and apparatus of preventing bandwidth part misalignment in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes transmitting a Scheduling Request (SR) on a first uplink bandwidth part (BWP). The method further includes receiving a response for the SR on a first downlink BWP. The method also includes detecting a beam failure when using the first uplink BWP and the first downlink BWP. In addition, the method includes transmitting a beam failure recovery (BFR) request to a network node on the first uplink BWP. Furthermore, the method includes receiving a control signalling on a second downlink BWP from the network node after transmitting the BFR request, wherein the control signalling is a response for the BFR request and the second downlink BWP is associated with the first uplink BWP.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named"3rd Generation Partnership Project" referred to herein as 3GPP, including: TR 38.913 V14.1.0, "Study on Scenarios and Requirements for Next Generation Access Technologies"; TS 36.321 V14.3.0, "Evolved Universal Terrestrial Radio Access (E-UTRA); Medium Access Control (MAC) protocol specification"; TR 38.802 V14.1.0, "Study on New Radio Access Technology Physical Layer Aspects"; RAN1#89 Chairman's note; RAN1#adhoc2 Chairman's note; RAN1#90 Chairman's note; and R2-1707198, "Beam Recovery in NR", Nokia and Alcatel-Lucent Shanghai Bell. The standards and documents listed above are hereby expressly incorporated by reference in their entirety.

Figure 1:
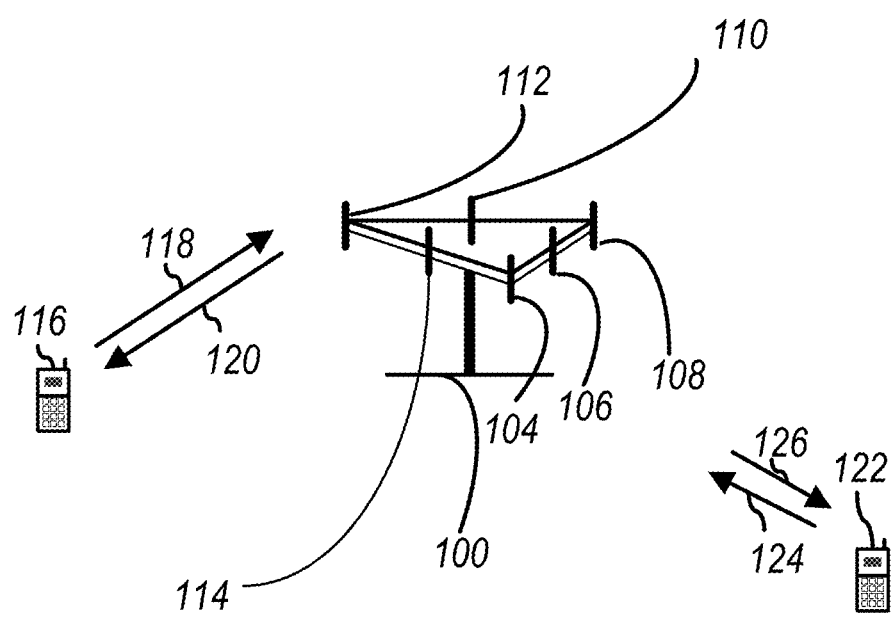
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
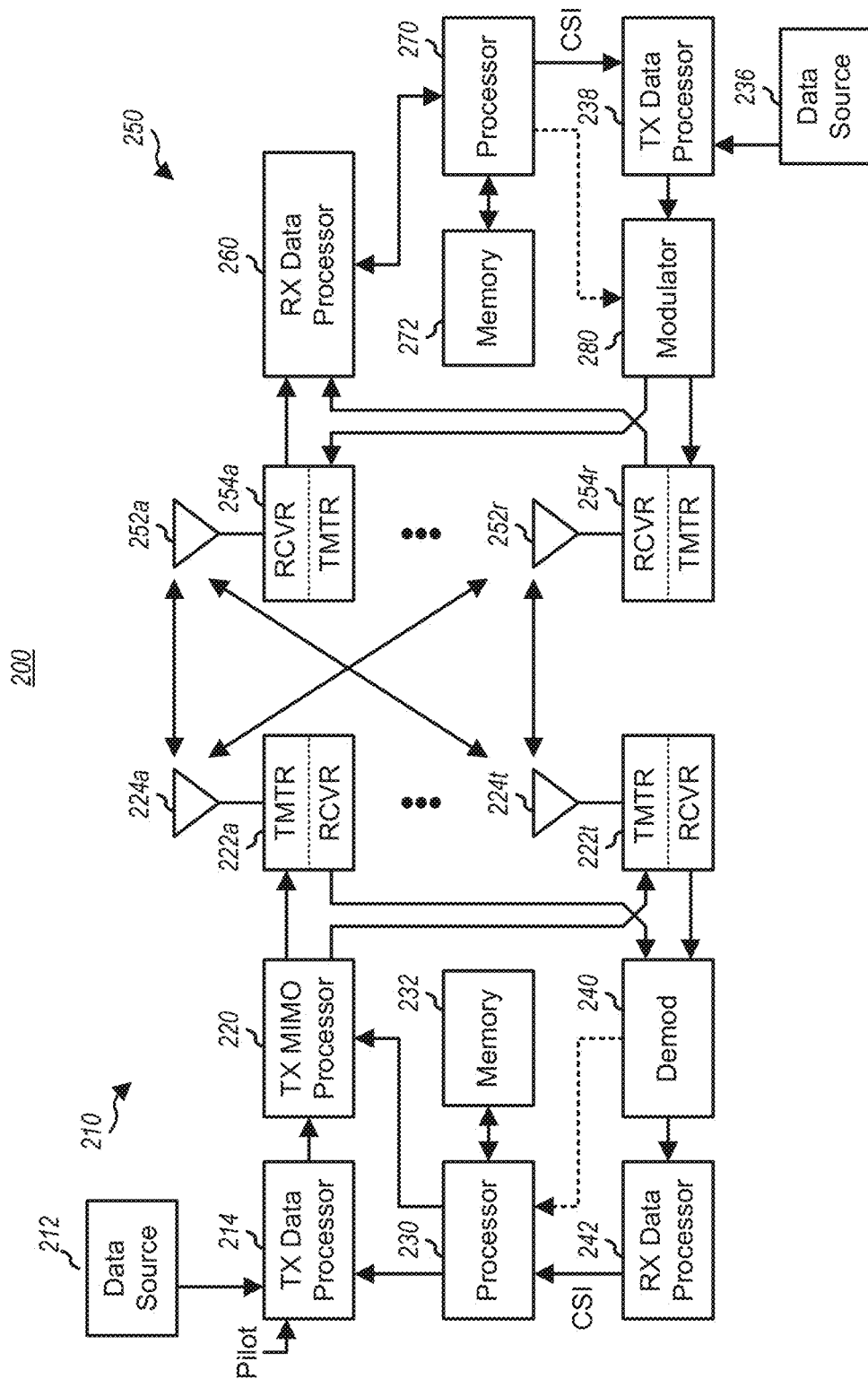
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
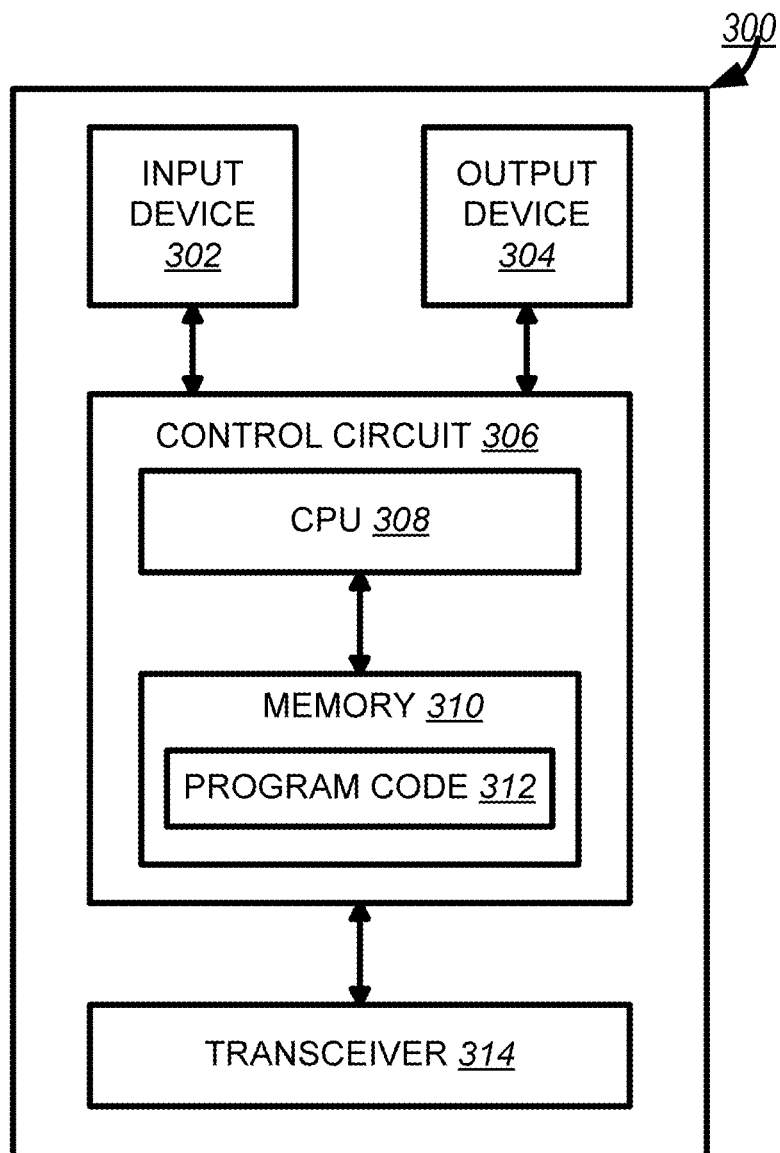
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
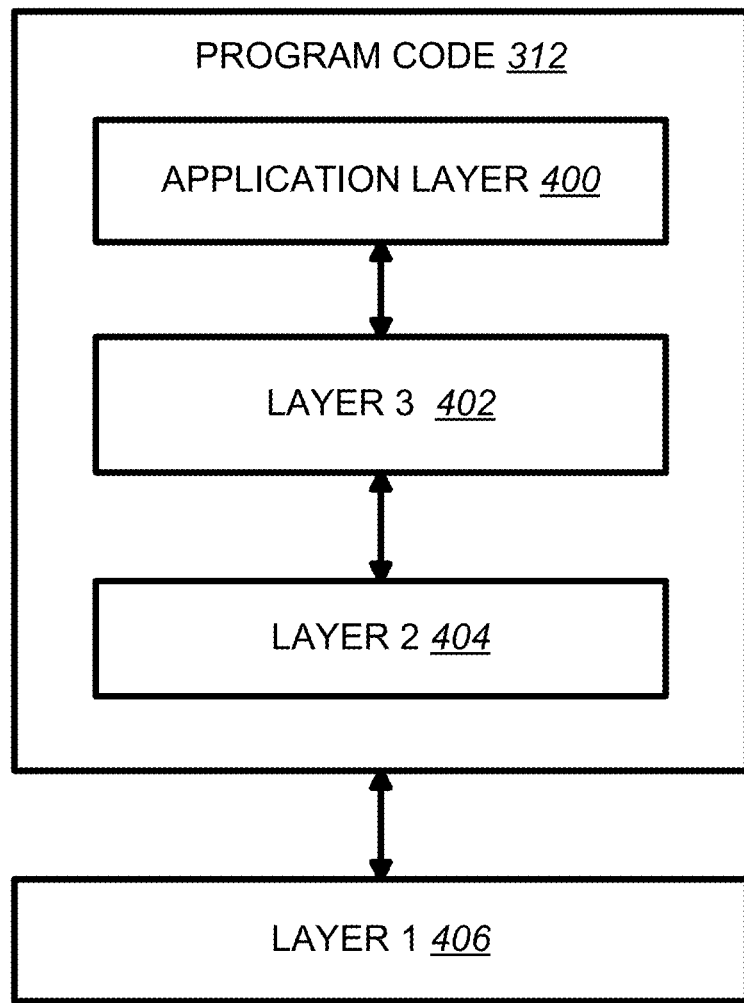
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
  eMBB (enhanced Mobile Broadband)
  mMTC (massive Machine Type Communications)
  URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

In LTE, random access, SR (Scheduling Request) and BSR (Buffer Status Report) procedures are defined in 3GPP TS 36.321. The random access procedure, the SR procedure, and the BSR procedure are design for UE to autonomously request uplink resource for data available for transmission in the buffer as follows:

5.1 Random Access Procedure 5.1.1 Random Access Procedure Initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

Before the procedure can be initiated, the following information for related Serving Cell is assumed to be available for UEs other than NB-IoT UEs, BL UEs or UEs in enhanced coverage [8], unless explicitly stated otherwise:
  the available set of PRACH resources for the transmission of the Random Access Preamble, prach-ConfigIndex.
  the groups of Random Access Preambles and the set of available Random Access Preambles in each group (SpCell only):
  The preambles that are contained in Random Access Preambles group A and Random Access Preambles group B are calculated from the parameters numberOfRA-Preambles and sizeOfRA-PreamblesGroupA:
  If sizeOfRA-PreamblesGroupA is equal to numberOfRA-Preambles then there is no Random Access Preambles group B. The preambles in Random Access Preamble group A are the preambles 0 to sizeOfRA-PreamblesGroupA−1 and, if it exists, the preambles in Random Access Preamble group B are the preambles sizeOfRA-PreamblesGroupA to numberOfRA-Preambles−1 from the set of 64 preambles as defined in [7].
  if Random Access Preambles group B exists, the thresholds, messagePowerOffsetGroupB and messageSizeGroupA, the configured UE transmitted power of the Serving Cell performing the Random Access Procedure, $P_{CMAX,c}$[10], and the offset between the preamble and Msg3, deltaPreambleMsg3, that are required for selecting one of the two groups of Random Access Preambles (SpCell only).
  the RA response window size ra-ResponseWindowSize.
  the power-ramping factor powerRampingStep.
  the maximum number of preamble transmission preambleTransMax.
  the initial preamble power preambleInitialReceivedTargetPower.
  the preamble format based offset DELTA_PREAMBLE (see subclause 7.6).
  the maximum number of Msg3 HARQ transmissions maxHARQ-Msg3Tx (SpCell only).
  the Contention Resolution Timer mac-ContentionResolutionTimer (SpCell only).
  NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage [8]:
  if the UE is a BL UE or a UE in enhanced coverage:
    the available set of PRACH resources associated with each enhanced coverage level supported in the Serving Cell for the transmission of the Random Access Preamble, prach-ConfigIndex.
    the groups of Random Access Preambles and the set of available Random Access Preambles in each group (SpCell only):
    If sizeOfRA-PreamblesGroupA is not equal to numberOfRA-Preambles:
      Random Access Preambles group A and B exist and are calculated as above;
    else:
      the preambles that are contained in Random Access Preamble groups for each enhanced coverage level, if it exists, are the preambles firstPreamble to lastPreamble.
    NOTE: When a PRACH resource is shared for multiple CE-levels, and CE-level are differentiated by different preamble indices, Group A and Group B is not used for this PRACH resource.
  if the UE is an NB-IoT UE:
    the available set of PRACH resources supported in the Serving Cell on the anchor carrier, nprach-ParametersList, and on the non-anchor carriers, in ul-ConfigList.
    for random access resource selection and preamble transmission:
      a PRACH resource is mapped into an enhanced coverage level.
      each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers as specified in TS 36.211 [7, 10.1.6.1]. Each group is referred to as a Random Access Preamble group below in the procedure text.

a subcarrier is identified by the subcarrier index in the range: [nprach-SubcarrierOffset, nprach-SubcarrierOffset+nprach-NumSubcarriers−1]

each subcarrier of a Random Access Preamble group corresponds to a Random Access Preamble.

when the subcarrier index is explicitly sent from the eNB as part of a PDCCH order ra-PreambleIndex shall be set to the signalled subcarrier index.

the mapping of the PRACH resources into enhanced coverage levels is determined according to the following:

the number of enhanced coverage levels is equal to one plus the number of RSRP thresholds present in rsrp-ThresholdsPrachInfoList.

each enhanced coverage level has one anchor carrier PRACH resource present in nprach-ParametersList and zero or one PRACH resource for each non-anchor carrier signalled in ul-ConfigList.

enhanced coverage levels are numbered from 0 and the mapping of PRACH resources to enhanced coverage levels are done in increasing numRepetitionsPerPreambleAttempt order.

when multiple carriers provide PRACH resources for the same enhanced coverage level, the UE will randomly select one of them using the following selection probabilities:

the selection probability of the anchor carrier PRACH resource for the given enhanced coverage level, nprach-ProbabilityAnchor, is given by the corresponding entry in nprach-ProbabilityAnchorList the selection probability is equal for all non-anchor carrier PRACH resources and the probability of selecting one PRACH resource on a given non-anchor carrier is (1−nprach-ProbabilityAnchor)/(number of non-anchor NPRACH resources)

the criteria to select PRACH resources based on RSRP measurement per enhanced coverage level supported in the Serving Cell rsrp-ThresholdsPrachInfoList.

the maximum number of preamble transmission attempts per enhanced coverage level supported in the Serving Cell maxNumPreambleAttemptCE.

the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX,c}$ [10].

the RA response window size ra-ResponseWindowSize and the Contention Resolution Timer mac-ContentionResolutionTimer (SpCell only) per enhanced coverage level supported in the Serving Cell.

the power-ramping factor powerRampingStep.

the maximum number of preamble transmission preambleTransMax-CE.

the initial preamble power preambleInitialReceivedTargetPower.

the preamble format based offset DELTA_PREAMBLE (see subclause 7.6). For NB-IoT the DELTA_PREAMBLE is set to 0.

The Random Access procedure shall be performed as follows:

Flush the Msg3 buffer;

set the PREAMBLE_TRANSMISSION_COUNTER to 1;

if the UE is an NB-IoT UE, a BL UE or a UE in enhanced coverage:

set the PREAMBLE_TRANSMISSION_COUNTER_CE to 1;

if the starting enhanced coverage level, or for NB-IoT the starting number of NPRACH repetitions, has been indicated in the PDCCH order which initiated the Random Access procedure, or if the starting enhanced coverage level has been provided by upper layers:

the MAC entity considers itself to be in that enhanced coverage level regardless of the measured RSRP;

else:

if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:

the MAC entity considers to be in enhanced coverage level 3;

else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:

the MAC entity considers to be in enhanced coverage level 2;

else if the measured RSRP is less than the RSRP threshold of enhanced coverage level 1 as configured by upper layers in rsrp-ThresholdsPrachInfoList then:

the MAC entity considers to be in enhanced coverage level 1;

else:

the MAC entity considers to be in enhanced coverage level 0;

set the backoff parameter value to 0 ms;

for the RN, suspend any RN subframe configuration;

proceed to the selection of the Random Access Resource (see subclause 5.1.2).

NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

NOTE: An NB-IoT UE measures RSRP on the anchor carrier.

5.1.2 Random Access Resource Selection

The Random Access Resource selection procedure shall be performed as follows:

For BL UEs or UEs in enhanced coverage, select the PRACH resource set corresponding to the selected enhanced coverage level.

If, except for NB-IoT, ra-PreambleIndex (Random Access Preamble) and ra-PRACH-MaskIndex (PRACH Mask Index) have been explicitly signalled and ra-PreambleIndex is not 000000:
  the Random Access Preamble and the PRACH Mask Index are those explicitly signalled;
else, for NB-IoT, if ra-PreambleIndex (Random Access Preamble) and PRACH resource have been explicitly signalled:
  the PRACH resource is that explicitly signalled;
  if the ra-PreambleIndex signalled is not 000000:
    the Random Access Preamble is set to nprach-SubcarrierOffset+nprach-NumCBRA-StartSubcarriers+(ra-PreambleIndex modulo (nprach-NumSubcarriers−nprach-NumCBRA-StartSubcarriers)), where nprach-SubcarrierOffset, nprach-NumCBRA-StartSubcarriers and nprach-NumSubcarriers are parameters in the currently used PRACH resource.
  else:
    select the Random Access Preamble group according to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
    randomly select a Random Access Preamble within the selected group.
else the Random Access Preamble shall be selected by the MAC entity as follows:
  For BL UEs or UEs in enhanced coverage, if Random Access Preamble group B does not exist, select the Random Access Preambles group corresponding to the selected enhanced coverage level.
  For NB-IoT, randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
  Except for BL UEs or UEs in enhanced coverage in case preamble group B does not exist, or except for NB-IoT UEs, if Msg3 has not yet been transmitted, the MAC entity shall:
    if Random Access Preambles group B exists and any of the following events occur:
    the potential message size (UL data available for transmission plus MAC header and, where required, MAC control elements) is greater than messageSizeGroupA and the pathloss is less than $P_{CMAX,c}$ (of the Serving Cell performing the Random Access Procedure)−preambleInitialReceivedTargetPower−deltaPreambleMsg3−messagePowerOffsetGroupB;
    the Random Access procedure was initiated for the CCCH logical channel and the CCCH SDU size plus MAC header is greater than messageSizeGroupA;
    select the Random Access Preambles group B;
      else:
    select the Random Access Preambles group A.
  else, if Msg3 is being retransmitted, the MAC entity shall:
    select the same group of Random Access Preambles as was used for the preamble transmission attempt corresponding to the first transmission of Msg3.
  randomly select a Random Access Preamble within the selected group. The random function shall be such that each of the allowed selections can be chosen with equal probability;
except for NB-IoT, set PRACH Mask Index to 0.
determine the next available subframe containing PRACH permitted by the restrictions given by the prach-ConfigIndex (except for NB-IoT), the PRACH Mask Index (except for NB-IoT, see subclause 7.3), physical layer timing requirements [2] and in case of NB-IoT, the subframes occupied by PRACH resources related to a higher enhanced coverage level (a MAC entity may take into account the possible occurrence of measurement gaps when determining the next available PRACH subframe);
if the transmission mode is TDD and the PRACH Mask Index is equal to zero:
  if ra-PreambleIndex was explicitly signalled and it was not 000000 (i.e., not selected by MAC):
    randomly select, with equal probability, one PRACH from the PRACHs available in the determined subframe.
  else:
    randomly select, with equal probability, one PRACH from the PRACHs available in the determined subframe and the next two consecutive subframes.
else:
  determine a PRACH within the determined subframe in accordance with the requirements of the PRACH Mask Index, if any.
for NB-IoT UEs, BL UEs or UEs in enhanced coverage, select the ra-ResponseWindowSize and mac-ContentionResolutionTimer corresponding to the selected enhanced coverage level and PRACH.
proceed to the transmission of the Random Access Preamble (see subclause 5.1.3).

5.1.3 Random Access Preamble Transmission

The random-access procedure shall be performed as follows:
set PREAMBLE_RECEIVED_TARGET_POWER to preambleInitialReceivedTargetPower+ DELTA_PREAMBLE+(PREAMBLE_TRANSMISSION_COUNTER−1)*powerRampingStep;
if the UE is a BL UE or a UE in enhanced coverage:
  the PREAMBLE_RECEIVED_TARGET_POWER is set to: PREAMBLE_RECEIVED_TARGET_POWER−10*log 10(numRepetitionPerPreambleAttempt);
if NB-IoT:
  for enhanced coverage level 0, the PREAMBLE_RECEIVED_TARGET_POWER is set to: PREAMBLE_RECEIVED_TARGET_POWER−10*log 10(numRepetitionPerPreambleAttempt)
  for other enhanced coverage levels, the PREAMBLE_RECEIVED_TARGET_POWER is set corresponding to the max UE output power;
if the UE is an NB-IoT UE, a BL UE or a UE in enhanced coverage:
  instruct the physical layer to transmit a preamble with the number of repetitions required for preamble transmission corresponding to the selected preamble group (i.e., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.

else:

instruct the physical layer to transmit a preamble using the selected PRACH, corresponding RA-RNTI, preamble index and PREAMBLE_RECEIVED_TARGET_POWER.

5.1.4 Random Access Response Reception

Once the Random Access Preamble is transmitted and regardless of the possible occurrence of a measurement gap or a Sidelink Discovery Gap for Transmission or a Sidelink Discovery Gap for Reception, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding coverage level, and in case the number of NPRACH repetitions is less than 64, RA Response window starts at the subframe that contains the end of the last preamble repetition plus 4 subframes and has length ra-ResponseWindowSize for the corresponding coverage level. The RA-RNTI associated with the PRACH in which the Random Access Preamble is transmitted, is computed as:

$$RA\text{-}RNTI=1+t\_id+10*f\_id$$

where t_id is the index of the first subframe of the specified PRACH (0≤t_id<10), and f_id is the index of the specified PRACH within that subframe, in ascending order of frequency domain (0≤f_id<6) except for NB-IoT UEs, BL UEs or UEs in enhanced coverage. If the PRACH resource is on a TDD carrier, the f_id is set to $f_{RA}$, where $f_{RA}$ is defined in Section 5.7.1 of [7].

For BL UEs and UEs in enhanced coverage, RA-RNTI associated with the PRACH in which the Random Access Preamble is transmitted, is computed as:

$$RA\text{-}RNTI=1+t\_id+10*f\_id+60*(SFN\_id \bmod (W\max/10))$$

where t_id is the index of the first subframe of the specified PRACH (0≤t_id<10), f_id is the index of the specified PRACH within that subframe, in ascending order of frequency domain (0≤f_id<6), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to $f_{RA}$, where $f_{RA}$ is defined in Section 5.7.1 of [7].

For NB-IoT UEs, the RA-RNTI associated with the PRACH in which the Random Access Preamble is transmitted, is computed as:

$$RA\text{-}RNTI=1+\lfloor SFN\_id/4 \rfloor+256*carrier\_id$$

where SFN_id is the index of the first radio frame of the specified PRACH and carrier_id is the index of the UL carrier associated with the specified PRACH. The carrier_id of the anchor carrier is 0.

The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:

if the Random Access Response contains a Backoff Indicator subheader:

set the backoff parameter value as indicated by the BI field of the Backoff Indicator subheader and Table 7.2-1, except for NB-IoT where the value from Table 7.2-2 is used.

else, set the backoff parameter value to 0 ms.

if the Random Access Response contains a Random Access Preamble identifier corresponding to the transmitted Random Access Preamble (see subclause 5.1.3), the MAC entity shall:

consider this Random Access Response reception successful and apply the following actions for the serving cell where the Random Access Preamble was transmitted:

process the received Timing Advance Command (see subclause 5.2);

indicate the preambleInitialReceivedTargetPower and the amount of power ramping applied to the latest preamble transmission to lower layers (i.e., (PREAMBLE_TRANSMISSION_COUNTER−1)*powerRampingStep);

if the SCell is configured with ul-Configuration-r14, ignore the received UL grant otherwise process the received UL grant value and indicate it to the lower layers;

if ra-PreambleIndex was explicitly signalled and it was not 000000 (i.e., not selected by MAC):

consider the Random Access procedure successfully completed.

if the UE is an NB-IoT UE:

the UL grant contained in the PDCCH transmission is valid only for the configured carrier.

else, if the Random Access Preamble was selected by the MAC entity:

set the Temporary C-RNTI to the value received in the Random Access Response message no later than at the time of the first transmission corresponding to the UL grant provided in the Random Access Response message;

if this is the first successfully received Random Access Response within this Random Access procedure:

if the transmission is not being made for the CCCH logical channel, indicate to the Multiplexing and assembly entity to include a C-RNTI MAC control element in the subsequent uplink transmission;

obtain the MAC PDU to transmit from the "Multiplexing and assembly" entity and store it in the Msg3 buffer.

NOTE: When an uplink transmission is required, e.g., for contention resolution, the eNB should not provide a grant smaller than 56 bits (or 88 bits for NB-IoT) in the Random Access Response.

NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response or, for BL UEs or UEs in enhanced coverage for mode B operation, no PDCCH scheduling Random Access Response is received within the RA Response window, or if none of all received Random Access Responses contains a Random Access Preamble identifier corresponding to the transmitted Random Access Preamble, the Random Access Response reception is considered not successful and the MAC entity shall:
    if the notification of power ramping suspension has not been received from lower layers:
        increment PREAMBLE_TRANSMISSION_COUNTER by 1;
    if the UE is an NB-IoT UE, a BL UE or a UE in enhanced coverage:
        if PREAMBLE_TRANSMISSION_COUNTER= preambleTransMax-CE+1:
            if the Random Access Preamble is transmitted on the SpCell:
        indicate a Random Access problem to upper layers;
        if NB-IoT:
            consider the Random Access procedure unsuccessfully completed;
    else:
        if PREAMBLE_TRANSMISSION_COUNTER= preambleTransMax+1:
            if the Random Access Preamble is transmitted on the SpCell:
        indicate a Random Access problem to upper layers;
            if the Random Access Preamble is transmitted on an SCell:
        consider the Random Access procedure unsuccessfully completed.
    if in this Random Access procedure, the Random Access Preamble was selected by MAC:
        based on the backoff parameter, select a random backoff time according to a uniform distribution between 0 and the Backoff Parameter Value;
        delay the subsequent Random Access transmission by the backoff time;
    else if the SCell where the Random Access Preamble was transmitted is configured with ul-Configuration-r14:
        delay the subsequent Random Access transmission until the Random Access Procedure is initiated by a PDCCH order with the same ra-PreambleIndex and ra-PRACH-MaskIndex;
    if the UE is an NB-IoT UE, a BL UE or a UE in enhanced coverage:
        increment PREAMBLE_TRANSMISSION_COUNTER_CE by 1;
        if PREAMBLE_TRANSMISSION_COUNTER_CE= maxNumPreambleAttemptCE for the corresponding enhanced coverage level+1:
            reset PREAMBLE_TRANSMISSION_COUNTER_CE;
            consider to be in the next enhanced coverage level, if it is supported by the Serving Cell and the UE, otherwise stay in the current enhanced coverage level;
        if the UE is an NB-IoT UE:
            if the Random Access Procedure was initiated by a PDCCH order:
                select the PRACH resource in the list of UL carriers providing a PRACH resource for the selected enhanced coverage level for which the carrier index is equal to (((Carrier Index from the PDCCH order) modulo (Number of PRACH resources in the selected enhanced coverage));
                consider the selected PRACH resource as explicitly signalled;
    proceed to the selection of a Random Access Resource (see subclause 5.1.2).

5.1.5 Contention Resolution

Contention Resolution is based on either C-RNTI on PDCCH of the SpCell or UE Contention Resolution Identity on DL-SCH.

Once Msg3 is transmitted, the MAC entity shall:
    except for a BL UE or a UE in enhanced coverage, or an NB-IoT UE, start mac-ContentionResolutionTimer and restart mac-ContentionResolutionTimer at each HARQ retransmission;
    for a BL UE or a UE in enhanced coverage, or an NB-IoT UE, start mac-ContentionResolutionTimer and restart mac-ContentionResolutionTimer at each HARQ retransmission of the bundle in the subframe containing the last repetition of the corresponding PUSCH transmission;
    regardless of the possible occurrence of a measurement gap or Sidelink Discovery Gap for Reception, monitor the PDCCH until mac-ContentionResolutionTimer expires or is stopped;
    if notification of a reception of a PDCCH transmission is received from lower layers, the MAC entity shall:
        if the C-RNTI MAC control element was included in Msg3:
            if the Random Access procedure was initiated by the MAC sublayer itself or by the RRC sublayer and the PDCCH transmission is addressed to the C-RNTI and contains an UL grant for a new transmission; or
            if the Random Access procedure was initiated by a PDCCH order and the PDCCH transmission is addressed to the C-RNTI:
        consider this Contention Resolution successful;
        stop mac-ContentionResolutionTimer;
        discard the Temporary C-RNTI;
        if the UE is an NB-IoT UE:
            the UL grant or DL assignment contained in the PDCCH transmission is valid only for the configured carrier.
        consider this Random Access procedure successfully completed.
    else if the CCCH SDU was included in Msg3 and the PDCCH transmission is addressed to its Temporary C-RNTI:
        if the MAC PDU is successfully decoded:
        stop mac-ContentionResolutionTimer;
        if the MAC PDU contains a UE Contention Resolution Identity MAC control element; and
        if the UE Contention Resolution Identity included in the MAC control element matches the 48 first bits of the CCCH SDU transmitted in Msg3:
            consider this Contention Resolution successful and finish the disassembly and demultiplexing of the MAC PDU;

set the C-RNTI to the value of the Temporary C-RNTI;
discard the Temporary C-RNTI;
consider this Random Access procedure successfully completed.
else
discard the Temporary C-RNTI;
consider this Contention Resolution not successful and discard the successfully decoded MAC PDU.
if mac-ContentionResolutionTimer expires:
discard the Temporary C-RNTI;
consider the Contention Resolution not successful.
if the Contention Resolution is considered not successful the MAC entity shall:
flush the HARQ buffer used for transmission of the MAC PDU in the Msg3 buffer;
if the notification of power ramping suspension has not been received from lower layers:
increment PREAMBLE_TRANSMISSION_COUNTER by 1;
if the UE is an NB-IoT UE, a BL UE or a UE in enhanced coverage:
if PREAMBLE_TRANSMISSION_COUNTER= preambleTransMax-CE+1:
indicate a Random Access problem to upper layers.
if NB-IoT:
consider the Random Access procedure unsuccessfully completed;
else:
if PREAMBLE_TRANSMISSION_COUNTER= preambleTransMax+1:
indicate a Random Access problem to upper layers.
based on the backoff parameter, select a random backoff time according to a uniform distribution between 0 and the Backoff Parameter Value;
delay the subsequent Random Access transmission by the backoff time;
proceed to the selection of a Random Access Resource (see subclause 5.1.2).

5.1.6 Completion of the Random Access Procedure

At completion of the Random Access procedure, the MAC entity shall:
discard explicitly signalled ra-PreambleIndex and ra-PRACH-MaskIndex, if any;
flush the HARQ buffer used for transmission of the MAC PDU in the Msg3 buffer.
In addition, the RN shall resume the suspended RN subframe configuration, if any.
[ . . . ]

5.4.4 Scheduling Request

The Scheduling Request (SR) is used for requesting UL-SCH resources for new transmission.

When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or, if all pending SR(s) are triggered by Sidelink BSR, when a MAC PDU is assembled and this PDU includes a Sidelink BSR which contains buffer status up to (and including) the last event that triggered a Sidelink BSR (see subclause 5.14.1.4), or, if all pending SR(s) are triggered by Sidelink BSR, when upper layers configure autonomous resource selection, or when the UL grant(s) can accommodate all pending data available for transmission.

If an SR is triggered and there is no other SR pending, the MAC entity shall set the SR_COUNTER to 0.

As long as one SR is pending, the MAC entity shall for each TTI:
if no UL-SCH resources are available for a transmission in this TTI:
if the MAC entity has no valid PUCCH resource for SR configured in any TTI and if rach-Skip for the MCG MAC entity or rach-SkipSCG for the SCG MAC entity is not configured: initiate a Random Access procedure (see subclause 5.1) on the SpCell and cancel all pending SRs;
else if the MAC entity has at least one valid PUCCH resource for SR configured for this TTI and if this TTI is not part of a measurement gap or Sidelink Discovery Gap for Transmission and if sr-ProhibitTimer is not running:
if SR_COUNTER<dsr-TransMax:
increment SR_COUNTER by 1;
instruct the physical layer to signal the SR on one valid PUCCH resource for SR;
start the sr-ProhibitTimer.
else:
notify RRC to release PUCCH for all serving cells;
notify RRC to release SRS for all serving cells;
clear any configured downlink assignments and uplink grants;
initiate a Random Access procedure (see subclause 5.1) on the SpCell and cancel all pending SRs.

NOTE: The selection of which valid PUCCH resource for SR to signal SR on when the MAC entity has more than one valid PUCCH resource for SR in one TTI is left to UE implementation.

NOTE: SR_COUNTER is incremented for each SR bundle. sr-ProhibitTimer is started in the first TTI of an SR bundle.

3GPP TR 38.802 describes beam failure and beam management as follows:

6.1.6.1 Beam Management

In NR, beam management is defined as follows:
Beam management: a set of L1/L2 procedures to acquire and maintain a set of TRP(s) and/or UE beams that can be used for DL and UL transmission/reception, which include at least following aspects:
Beam determination: for TRP(s) or UE to select of its own Tx/Rx beam(s).
Beam measurement: for TRP(s) or UE to measure characteristics of received beamformed signals
Beam reporting: for UE to report information of beamformed signal(s) based on beam measurement
Beam sweeping: operation of covering a spatial area, with beams transmitted and/or received during a time interval in a predetermined way.
[ . . . ]

NR supports that UE can trigger mechanism to recover from beam failure. Beam failure event occurs when the quality of beam pair link(s) of an associated control channel falls low enough (e.g. comparison with a threshold, time-out of an associated timer). Mechanism to recover from beam failure is triggered when beam failure occurs. Note that here the beam pair link is used for convenience, and may or may not be used in specification. Network explicitly configures to UE with resources for UL transmission of signals for recovery purpose. Configurations of resources are supported where the base station is listening from all or partial directions, e.g., random access region. The UL transmission/resources to report beam failure can be located in the same time instance as PRACH (resources orthogonal to PRACH resources) or at a time instance (configurable for a UE) different from PRACH. Transmission of DL signal is supported for allowing the UE to monitor the beams for identifying new potential beams.

In NR, beam recovery request is discussed in RAN1. RAN1#89 Chairman's note, RAN1#adhoc2 Chairman's note, and RAN1#90 Chairman's note including the following agreements related to beam recovery request:

Agreements:
Consider following new use cases for RACH design,
   beam recovery requests
   on demand SI requests
Study the following aspects:
   requirements to satisfy above new use cases
   impact on capacity
   whether additional preamble format(s) is needed
   impact on RACH procedure
Working Assumption:
Support at least the following triggering condition(s) for beam failure recovery request transmission:
   Condition 1: when beam failure is detected and candidate beam is identified at least for the case when only CSI-RS is used for new candidate beam identification
   FFS Condition 2: Beam failure is detected alone at least for the case of no reciprocity
      FFS how the recovery request is transmitted without knowledge of candidate beam
   Note: if both conditions are supported, which triggering condition to use by UE also depends on both gNB configuration and UE capability
Agreements:
Support the following channel(s) for beam failure recovery request transmission:
   Non-contention based channel based on PRACH, which uses a resource orthogonal to resources of other PRACH transmissions, at least for the FDM case
      FFS other ways of achieving orthogonality, e.g., CDM/TDM with other PRACH resources
      FFS whether or not have different sequence and/or format than those of PRACH for other purposes
      Note: this does not prevent PRACH design optimization attempt for beam failure recovery request transmission from other agenda item
      FFS: Retransmission behavior on this PRACH resource is similar to regular RACH procedure
   Support using PUCCH for beam failure recovery request transmission
      FFS whether PUCCH is with beam sweeping or not
      Note: this may or may not impact PUCCH design
   FFS Contention-based PRACH resources as supplement to contention-free beam failure recovery resources
      From traditional RACH resource pool
      4-step RACH procedure is used
      Note: contention-based PRACH resources is used e.g., if a new candidate beam does not have resources for contention-free PRACH-like transmission
   FFS whether a UE is semi-statically configured to use one of them or both, if both, whether or not support dynamic selection of one of the channel(s) by a UE if the UE is configured with both
Agreements:
To receive gNB response for beam failure recovery request, a UE monitors NR PDCCH with the assumption that the corresponding PDCCH DM-RS is spatial QCL'ed with RS of the UE-identified candidate beam(s)
   FFS whether the candidate beam(s) is identified from a preconfigured set or not
   Detection of a gNB's response for beam failure recovery request during a time window is supported
      FFS the time window is configured or pre-determined
      FFS the number of monitoring occasions within the time window
      FFS the size/location of the time window
      If there is no response detected within the window, the UE may perform re-tx of the request
      FFS details
   If not detected after a certain number of transmission (s), UE notifies higher layer entities
      FFS the number of transmission(s) or possibly further in combination with or solely determined by a timer
Agreements:
RAN1 agrees that the certain number of beam failure recovery request transmissions is NW configurable by using some parameters
Parameters used by the NW could be:
   Number of transmissions
   Solely based on timer
   Combination of above
FFS: whether beam failure recovery procedure is influenced by the RLF event
Agreements:
NR studies reporting of SS block index, e.g., strongest SS block index, through Msg3 of contention based random access
NR studies reporting of multiple SS block indices through Msg1 of contention free random access procedure
e.g. network can assign multiple RACH transmission times and RACH preambles to the UE. UE can convey one SS block index by selecting a RACH transmission time and another SS block index implicitly by selecting a RACH preamble
Agreements:
There is an initial active DL/UL bandwidth part pair to be valid for a UE until the UE is explicitly (re)configured with bandwidth part(s) during or after RRC connection is established
   The initial active DL/UL bandwidth part is confined within the UE minimum bandwidth for the given frequency band
   FFS: details of initial active DL/UL bandwidth part are discussed in initial access agenda
Support activation/deactivation of DL and UL bandwidth part by explicit indication at least in (FFS: scheduling) DCI
   FFS: In addition, MAC CE based approach is supported
Support activation/deactivation of DL bandwidth part by means of timer for a UE to switch its active DL bandwidth part to a default DL bandwidth part
   The default DL bandwidth part can be the initial active DL bandwidth part defined above FFS: The default DL bandwidth part can be reconfigured by the network FFS: detailed mechanism of timer-based solution (e.g. introducing a new timer or reusing DRX timer)

FFS: other conditions to switch to default DL bandwidth part

In RAN2, some discussion related to beam recovery is contributed in RAN2#NR adhoc 2 meeting, as described in 3GPP R2-1707198 as follows:

Beam Recovery

In UE event triggered beam recovery, UE is configured with certain conditions when it determines the need for beam recovery. One potential way to detect need for recovery is to use the beam measurements (provided by L1). L2 may be configured to monitor specific beams that are allocated for PDCCH reception. Detecting signal degradation on those beams should trigger recovery actions. For the recovery actions, UE should indicate to the network new potential beams (if available) via L1/L2 beam reporting or it should request network to switch to alternative beam (for PDCCH monitoring) if such beam exists.

For beam recovery following signals/channels could be used:

Contention Free Signals/Scheduling Request on PUCCH/PRACH:

RAN1 has not yet explicitly agreed to have the scheduling request signals configured to PRACH period but has agreed that SR can be conveyed at least on PUCCH.

Scheduling request, SR, is conventionally used by UE to request UL-SCH resources for new data transmission. From beam management perspective, SR can be used to request resources for transmitting beam report to indicate candidate beams (CSI-RS) for PDCCH reception. Specific triggering conditions can be specified and configured by the network when the UE can trigger SR transmission for beam recovery. SR may also be used for other beam management events.

RAN1 has agreed that beam recovery signal may be additionally used for SR. In our view the SR and beam recovery signal should have joint design and configuration: SR signal can indicate both recovery request and scheduling request.

SR signal should be able to be configured to indicate at least specific SS block: If UE detects alternative beams (based on CSI-RS measurements) when current link has failed the SR can be triggered to a corresponding SS block.

RACH:

Use of Random access procedure may be used as fall back mechanism when the link cannot be recovered by other means (i.e. UE has not been configured with dedicated recovery signal such as SS block specific SR) but UE has detected potential beams in a current serving cell. In RA-procedure UE could indicate recovery by indicating new preferred beam by sending msg1 on RACH resource corresponding to a specific (SS block). Network is able to detect the link recovery e.g. based on the UE identity in msg3. Additionally, UE may send beam report e.g. in msg3.

Observation 1: SR signal (if configured) can be used for beam recovery. SR signal indicates a specific SS block.

Observation 2: Contention based RACH procedure can be used for beam recovery as a fall back option.

SR triggers are defined in MAC spec in LTE, both for dedicated SR resources and random access. The same is assumed to apply in NR. It is beneficial to have all SR triggers in one place and therefore, the beam recovery triggers should be defined in MAC spec. Similarly, also the triggers to fallback to random access should be defined in the same place.

Proposal 1: If beam recovery procedure is configured to use contention free (dedicated) signaling resources such as SR, the trigger should be defined in MAC spec together with other triggers for SR.

Proposal 2: If beam recovery uses PRACH resources, the trigger should be defined in MAC (together with SR triggers).

Beam management for NR is discussed as mobility without RRC involvement. Beam recovery is part of the beam management. Therefore, it should be a L1/L2 procedure without RRC involvement i.e. beam recovery procedure tries to obtain new PDCCH beam when current PDCCH beam fails. Taking into account the proposals 3 and 4 we propose in general:

Proposal 3: Determining when to use contention free and when to use contention based recovery is a MAC layer function.

Proposal 4: Beam recovery is L1/L2 procedure without RRC involvement.

Proposal 5: Triggering Beam Recovery should be based on events that are network configurable.

Figure 5:
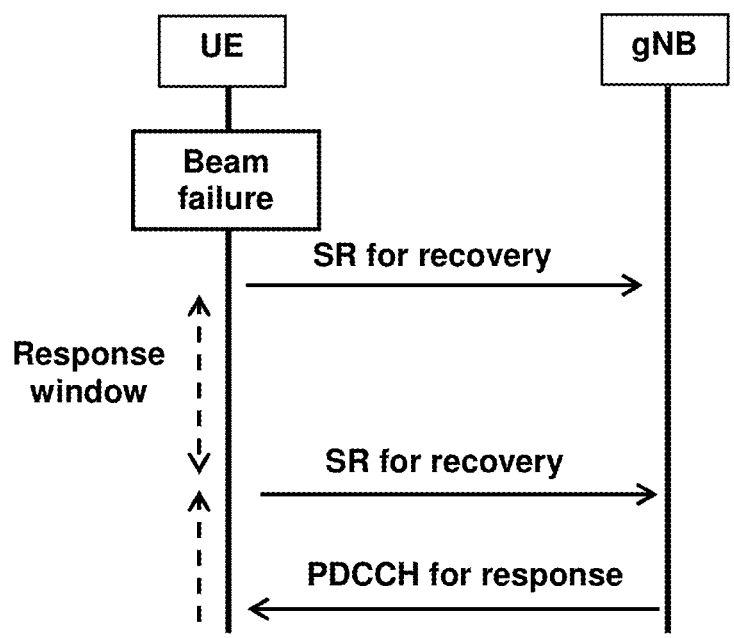
FIG. 5 illustrates an exemplary embodiment for beam recovery procedure according to one exemplary embodiment.

In the NR single cell case, if a UE detects beam failure in a cell, the UE could initiate beam recovery procedure to re-establish the beam pair between UE and network (e.g. TRP or base station or cell). The beam recovery procedure could be SR procedure. The SR procedure for beam recovery purpose is to transmit beam recovery request through uplink control channel. Details of the behavior can refer to RAN1 agreements. The beam recovery procedure could also be random access procedure. In one embodiment, the random access procedure for beam recovery purpose could be contention based random access. The beam recovery request could be transmitted through PRACH (Physical Random Access Channel) transmission and/or Msg3 transmission for contention based random access. Alternatively, the random access procedure for beam recovery purpose could be non-contention based random access. The beam recovery request could be transmitted through PRACH transmission for non-contention based random access. FIG. 5 illustrates an exemplary embodiment for beam recovery procedure in NR.

In NR, a bandwidth part concept is introduced for supporting multiple numerologies in a cell. In release 15, a UE will support multiple bandwidth parts in a cell, but only one of the multiple bandwidth parts will be activated at a time. A bandwidth part (e.g. an uplink bandwidth part or a downlink bandwidth part) will be activated and/or deactivated through downlink control signal. Moreover, the bandwidth part may be activated through RRC configuration (e.g. initial bandwidth part) and/or MAC (Medium Access Control) CE (Control Element). And each bandwidth part will be associated with a specific numerology. In beam recovery procedure, a UE will need to monitor downlink control channel for determining whether beam pair is successfully recovered. More specifically, UE needs to monitor downlink control signaling on candidate beams. Based on the bandwidth concept, after a UE transmits a beam recovery request on an uplink bandwidth part, it can be assumed that the UE will need to monitor downlink control channel associated with the current activated downlink bandwidth part of the cell occurred beam failure. Since it takes time to align the understanding of beam failure occurrence between network and UE, some downlink messages and some downlink control signals may not be successfully received by the UE. If a bandwidth activation command is not received by the UE, the UE and the network will have different understandings on the UE's activated downlink bandwidth part.

Figure 6:
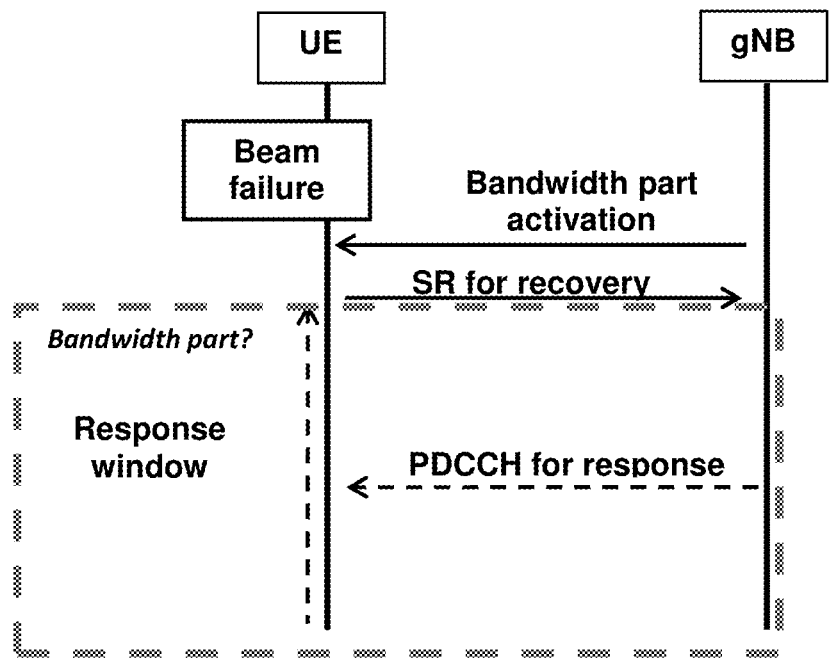
FIG. 6 is a diagram according to one exemplary embodiment.

An example of issue is shown in FIG. 6. In the example, a network tries to change a UE's downlink activated bandwidth part through a bandwidth part activation command. However, since a beam failure occurs, the UE will miss the bandwidth part activation command. In such case, it is hard for the network, which received the beam recovery request from the UE (e.g. SR for request) on an uplink bandwidth part, to know exactly timing of beam failure occurrence and which downlink bandwidth part is monitored by the UE. To solve such issue, some possible solutions could be considered.

Solution 1: Network implementation—One possible way is that network could transmit response(s) of beam recovery request on control channel(s) of any possible (downlink) bandwidth parts. Moreover, it will be beneficial if the response of beam recovery request could let UE to perform certain actions. The helpful process could include one or multiple actions listed below.
1. Change (downlink) activated bandwidth part
2. Perform a data transmission (e.g. a MAC layer report through MAC CE, RRC layer report, or MAC layer feedback)
3. Perform an uplink control information transmission (e.g. channel state information report, feedback)
4. Perform an uplink reference signal transmission (e.g. Sounding reference signal)

The drawback of this way is control channel resource waste.

Another possible way is to rely on timer-controlled based bandwidth part change. More specifically, in NR, a timer will be used to reset (downlink) activated bandwidth part. Network could response for the beam recovery request after expiry of the timer. Similar to previous method, it will be beneficial if the response of beam recovery request could let UE to perform certain actions. The helpful process could be one or multiple actions listed below.
1. Change (downlink) activated bandwidth part
2. Perform a data transmission (e.g. a MAC layer report through MAC CE, RRC layer report, or MAC layer feedback)
3. Perform an uplink control information transmission (e.g. channel state information report, feedback)
4. Perform an uplink reference signal transmission (e.g. Sounding reference signal)

Solution 2: UE directly indicates its activated bandwidth part—Since the issue is that the network does not know which (downlink) bandwidth part is activated in the UE side, one solution could be the UE directly informs the network about information of (downlink) bandwidth part. More specifically, the UE could transmit the (downlink) bandwidth part information to the network in beam recovery request. The (downlink) bandwidth part information could be carried in explicit or implicit way.

For example, the beam recovery request could carry an explicit field to indicate the bandwidth part information.

As another example, the network could derive the (downlink) bandwidth part information through the transmission of the beam recovery request. In one embodiment, the (downlink) bandwidth part information could be derived through reference signal of the transmission of the beam recovery request (e.g. DMRS or uplink reference signal). Alternatively, the (downlink) bandwidth part information could be derived through the (uplink) bandwidth part used for the transmission of the beam recovery request. Alternatively, the (downlink) bandwidth part information could be derived through PRACH resource (e.g. time domain and/or frequency domain and/or code domain) used for the transmission of beam recovery request. Alternatively, the (downlink) bandwidth part information could be derived through data transmission from the UE.

In one embodiment, the data transmission could be a data transmission that is not dynamically scheduled by downlink control signal. For example, the data transmission could be a Msg3 transmission in a contention random access procedure. Alternatively, the data transmission could be a first step transmission in a contention random access procedure. For example, the data transmission could be the Msg1 transmission in a message based random access procedure. Alternatively, the data transmission could be a data transmission paired with preamble in a contention random access procedure. Alternatively, the data transmission could be a beam recovery request. And the beam recovery request could be a beam recovery request for other cell (e.g. cells different from cell which UE transmitting the beam recovery request on).

In one embodiment, the network derives the bandwidth part information through the contents in the data transmission. The contents could be a MAC CE or a RRC (Radio Resource Control) message.

Figure 7:
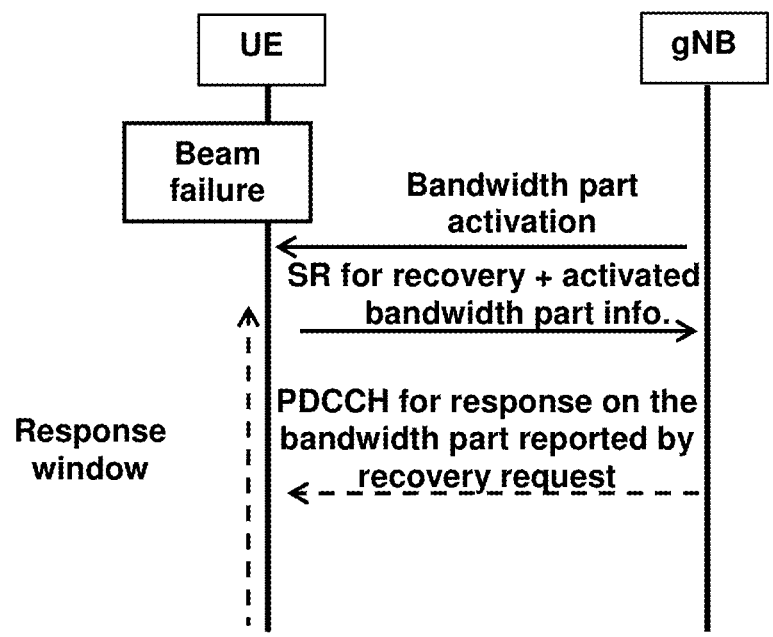
FIG. 7 is a diagram according to one exemplary embodiment.

In FIG. 7, a possible example for this solution is shown. In the example, a UE could transmit a beam recovery request on an uplink control channel. The beam recovery request could be transmitted as a scheduling request or a special scheduling request with extra information. After the network receives the beam recovery request from the UE, the network can derive exactly bandwidth part on which UE is monitoring response for recovering beam failure. And the network could transmit the signal for recovering the beam pair link between the UE and the network. The signal could be downlink control signal(s), reference signal(s), or synchronization signal(s). The signal could also be a MAC CE or a RRC message.

Solution 3: Automatic alignment procedure—A possible way for preventing such misalignment could be to let the network predicts the (downlink) activated bandwidth part of a UE in beam failure condition. To achieve this concept, several possible solutions are proposed below.

One possible way is to let a UE autonomously change the (downlink) activated bandwidth part to a specific (downlink) bandwidth part when beam failure occurs. In such way, the network could know which (downlink) bandwidth part should be used for responding beam recovery request from the UE. In one embodiment, the specific bandwidth part could be a default bandwidth part, a specific bandwidth part assigned by network (e.g. RRC configuration), a bandwidth part predefined in specification, a bandwidth part with PRACH resource allocation, or a specific bandwidth part assigned by network through system information.

Another possible way could be to let the UE transmits a feedback when receiving the bandwidth part activation command. In such way, the possibility of misalignment will be reduced. In one embodiment, the feedback could be an uplink control information. Alternatively, the feedback could be a MAC CE.

Figure 8:
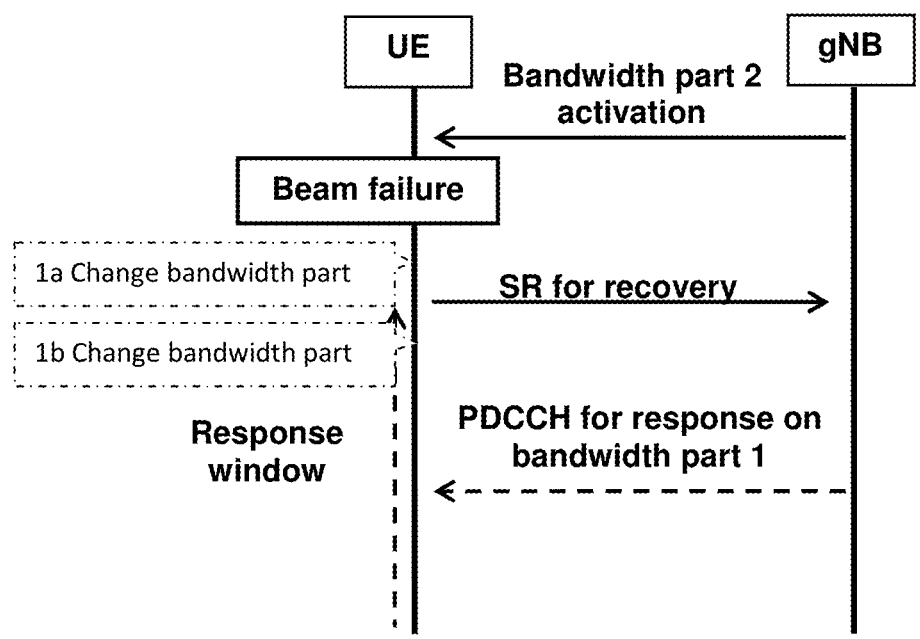
FIG. 8 is a diagram according to one exemplary embodiment.

In FIG. 8, a possible example for this solution is shown. In the example, a UE could change the activated bandwidth part to bandwidth part 2 based on a command received from the base station. When the UE detects beam failure, the UE will need to transmit a beam recovery request to the network. To prevent the issue, the UE could change (downlink) bandwidth part based on an association, which is established before transmitting the beam recovery request. The association is known by the base station and the UE. Alternatively, the UE could change (downlink) bandwidth part based on an association between transmission of the beam recovery request and possible reception opportunity for recovering signal. More specifically, the beam failure could be an event for triggering bandwidth part activation or bandwidth part change.

The association could be shared between the network and the UE. And the association can be defined in specification or be configured before beam failure. The UE could activate the (downlink) bandwidth part 1 by itself and starts to monitor recovering signal on the (downlink) bandwidth part.

Figure 9:
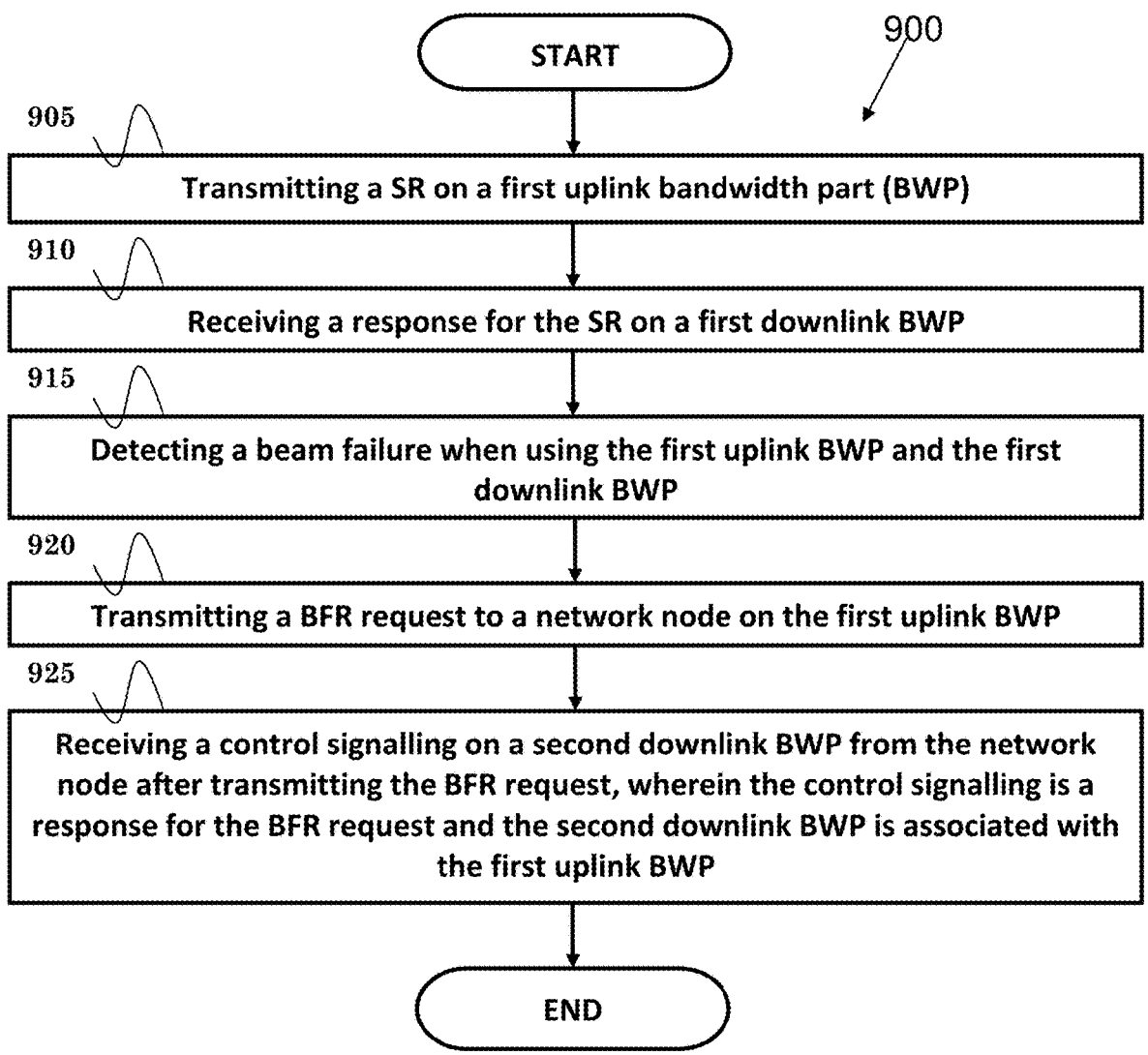
FIG. 9 is a flow chart according to one exemplary embodiment.

FIG. 9 is a flow chart 900 according to one exemplary embodiment from the perspective of a UE. In step 905, the UE transmits a SR on a first uplink BWP. In step 910, the UE receives a response for the SR on a first downlink BWP. In step 915, the UE detects a beam failure when using the first uplink BWP and the first downlink BWP. In step 920, the UE transmits a beam failure recovery (BFR) request to a network node on the first uplink BWP. In step 925, the UE receives a control signalling on a second downlink BWP from the network node after transmitting the BFR request, wherein the control signalling is a response for the BFR request and the second downlink BWP is associated with the first uplink BWP.

In one embodiment, the UE could change an activated bandwidth part from the first downlink BWP to the second downlink BWP in response to detection of the beam failure. In addition, the UE could determine that the beam failure is successfully recovered in response to reception of the control signalling.

In one embodiment, the UE could transmit the BFR request after changing the downlink BWP. The response could be transmitted by the network node in response to reception of the BFR request. The second downlink BWP is not activated (or not in use) when the beam failure is detected. The BFR request could be transmitted on PRACH.

In one embodiment, the control signalling could be an uplink grant or a downlink assignment. The association between the second downlink BWP and the first uplink BWP could be configured by the network node before the detection of the beam failure. The beam failure could trigger changing activated bandwidth part from the first downlink BWP to the second downlink BWP.

Referring back to FIGS. 3 and 4, in one exemplary embodiment of a UE, the device 300 includes a program code 312 stored in the memory 310. The CPU 308 could execute program code 312 to enable the UE (i) to transmit a SR on a first uplink bandwidth part BWP, (ii) to receive a response for the SR on a first downlink BWP, (iii) to detect a beam failure when using the first uplink BWP and the first downlink BWP, (iv) to transmit a BFR request to a network node on the first uplink BWP, and (v) to receive a control signalling on a second downlink BWP from the network node after transmitting the BFR request, wherein the control signalling is a response for the BFR request and the second downlink BWP is associated with the first uplink BWP. Furthermore, the CPU 308 can execute the program code 312 to perform all of the above-described actions and steps or others described herein.

Figure 10:
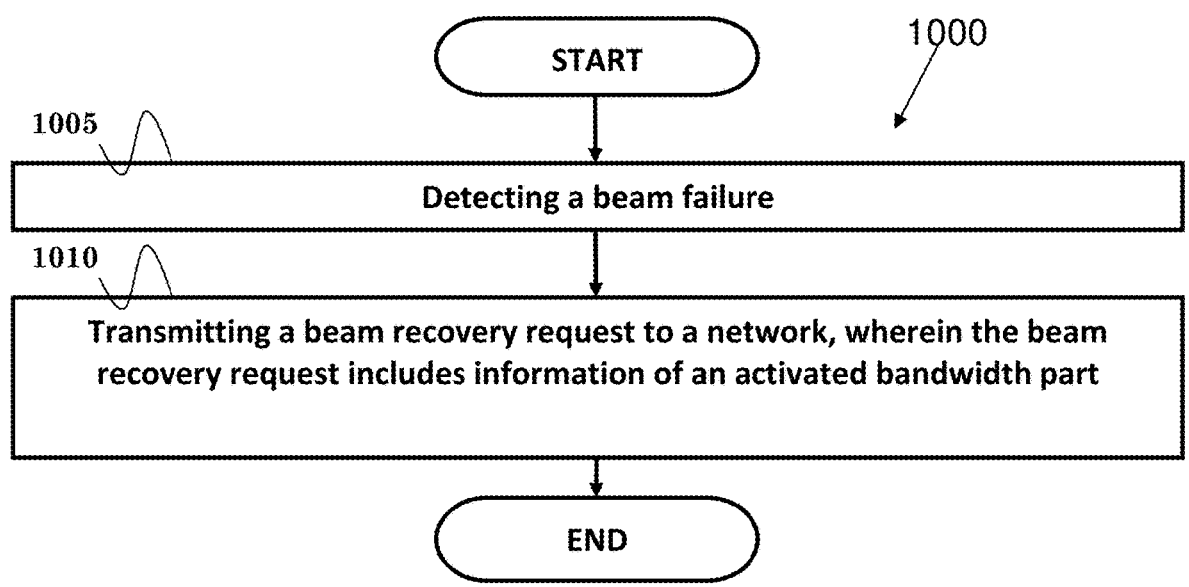
FIG. 10 is a flow chart according to one exemplary embodiment.

FIG. 10 is a flow chart 1000 according to one exemplary embodiment from the perspective of a UE. In step 1005, the UE detects a beam failure. In step 1010, the UE transmits a beam recovery request to a network, wherein the beam recovery request includes information of an activated bandwidth part.

In one embodiment, the UE could receive a control signal on the activated bandwidth part after the transmission of the beam recovery request. The UE could also determine the beam failure being recovered after the UE receives the control signal.

Referring back to FIGS. 3 and 4, in one exemplary embodiment of a UE, the device 300 includes a program code 312 stored in the memory 310. The CPU 308 could execute program code 312 to enable the UE (i) to detect a beam failure, and (ii) to transmit a beam recovery request to a network, wherein the beam recovery request includes information of an activated bandwidth part. Furthermore, the CPU 308 can execute the program code 312 to perform all of the above-described actions and steps or others described herein.

Figure 11:
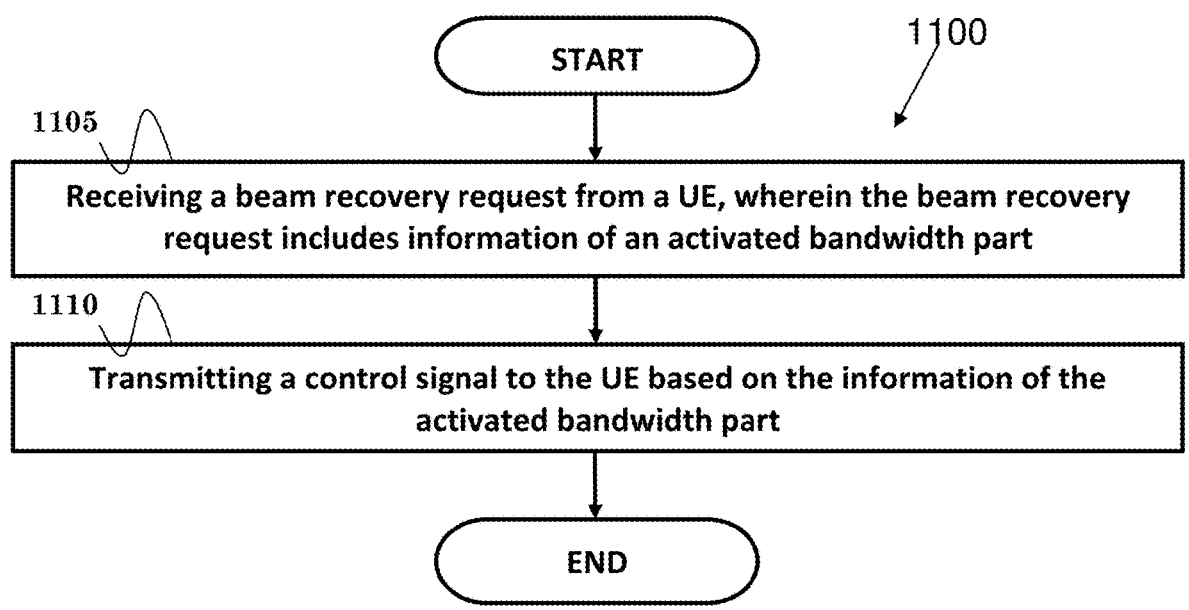
FIG. 11 is a flow chart according to one exemplary embodiment.

FIG. 11 is a flow chart 1100 according to one exemplary embodiment from the perspective of a base station. In step 1105, the base station receives a beam recovery request from a UE, wherein the beam recovery request includes information of an activated bandwidth part. In step 1110, the base station transmits a control signal to the UE based on the information of the activated bandwidth part.

Referring back to FIGS. 3 and 4, in one exemplary embodiment of a base station, the device 300 includes a program code 312 stored in the memory 310. The CPU 308 could execute program code 312 to enable the base station (i) to receive a beam recovery request from a UE, wherein the beam recovery request includes information of an activated bandwidth part, and (ii) to transmit a control signal to the UE based on the information of the activated bandwidth part. Furthermore, the CPU 308 can execute the program code 312 to perform all of the above-described actions and steps or others described herein.

In the context of the embodiments illustrated in FIGS. 10 and 11 and described above, in one embodiment, the beam recovery request could be an uplink control signal (e.g. uplink control information) or a PRACH transmission. The information of the activated bandwidth part could be a bandwidth part used by the beam recovery request, a field in the beam recovery request, a combination of time and/or frequency and/or code of a resource used by the transmission of the beam recovery request, or a reference signal transmitted with the beam recovery request. The control signal could be a downlink control information, a beam recovery confirmation signal, a downlink assignment, or an uplink grant.

In one embodiment, the activated bandwidth part could be a downlink bandwidth part, an uplink bandwidth part, or a bandwidth part on which UE is monitoring downlink control channel. The information of the activated bandwidth part could be an index of bandwidth part.

Figure 12:
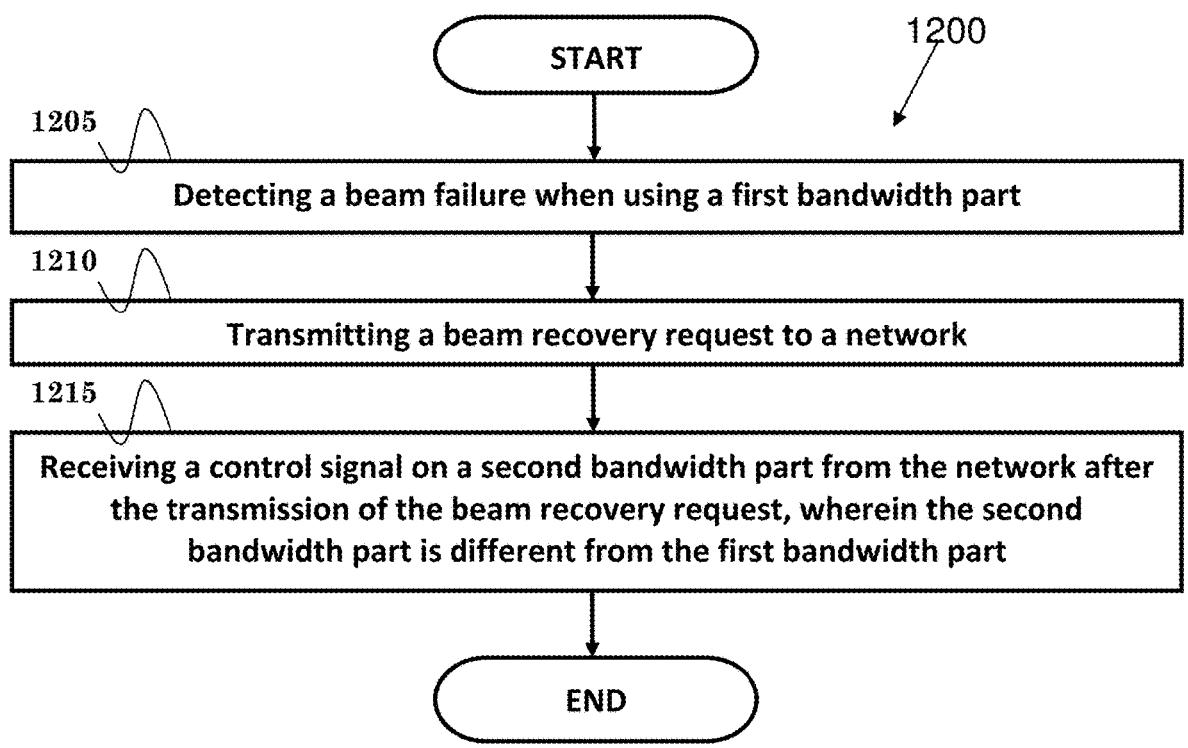
FIG. 12 is a flow chart according to one exemplary embodiment.

FIG. 12 is a flow chart 1200 according to one exemplary embodiment from the perspective of a UE. In step 1205, the UE detects a beam failure when using a first bandwidth part. In step 1210, the UE transmits a beam recovery request to a network. In step 1215, the UE receives a control signal on a second bandwidth part from the network after the transmission of the beam recovery request, wherein the second bandwidth part is different from the first bandwidth part.

In one embodiment, the UE may not receive a bandwidth part activation command from the network after detecting the beam failure. The UE could determine the beam failure being recovered after the UE receives the control signal.

In one embodiment, the second bandwidth part may not be activated when the beam failure is detected. The first bandwidth part may already be activated when the beam failure is detected. The beam recovery request could be an uplink control signal (e.g. uplink control information) or a PRACH transmission. The control signal could be a downlink control information, a beam recovery confirmation, a downlink assignment, or an uplink grant.

In one embodiment, the first bandwidth part could be associated with a first numerology, and the second bandwidth part could be associated with a second numerology. The first bandwidth part could be a downlink bandwidth part or a bandwidth part on which UE is monitoring a first downlink control channel. The second bandwidth part could be a downlink bandwidth part or a bandwidth part on which UE is monitoring a second downlink control channel.

In one embodiment, the UE cannot monitor control channels on the first bandwidth part and the second bandwidth part at same time. The first bandwidth part and the second bandwidth part could have different control channels. The first bandwidth part and the second bandwidth part could belong to same cell.

Referring back to FIGS. 3 and 4, in one exemplary embodiment of a UE, the device 300 includes a program code 312 stored in the memory 310. The CPU 308 could execute program code 312 to enable the UE (i) to detect a beam failure when using a first bandwidth part, (ii) to transmit a beam recovery request to a network, and (iii) to receive a control signal on a second bandwidth part from the network after the transmission of the beam recovery request, wherein the second bandwidth part is different from the first bandwidth part. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment), comprising:
   receiving, from a network node, a configuration for configuring multiple uplink bandwidth parts (BWP) and multiple downlink BWPs on a cell, wherein each BWP of the multiple uplink BWPs and the multiple downlink BWPs is associated with a specific numerology;
   detecting a beam failure on the cell when a first uplink BWP of the multiple uplink BWPs and a first downlink BWP of the multiple downlink BWPs are active;
   in response to detecting the beam failure, transmitting, to the network node, a beam failure recovery (BFR) request on the first uplink BWP, wherein the transmitting comprises indicating, to the network node, information of an active downlink BWP of the cell; and
   receiving, from the network node, a response to the BFR request on a specific downlink BWP of the multiple downlink BWPs, wherein the specific downlink BWP is associated with the first uplink BWP and the specific downlink BWP is the active downlink BWP of the cell when receiving the response to the BFR request.

2. The method of claim 1, further comprising:
   in response to detecting the beam failure and before transmitting the BFR request, identifying a new candidate beam based on downlink reference signals received on the cell.

3. The method of claim 1, wherein the specific downlink BWP is the first downlink BWP if the first downlink BWP is associated with the first uplink BWP, and the specific downlink BWP is a second downlink BWP if the first downlink BWP is not associated with the first uplink BWP.

4. The method of claim 1, further comprising:
   in response to detecting the beam failure, changing the active downlink BWP of the cell from the first downlink BWP to a second downlink BWP if the first downlink BWP is not associated with the first uplink BWP.

5. The method of claim 1, wherein the association of the specific downlink BWP with the first uplink BWP is:
   shared between the network node and the UE before detecting the beam failure; and
   at least one of defined in a specification or configured by the network node.

6. The method of claim 1, wherein the information of the active downlink BWP is derived based on the transmitting the BFR request on the first uplink BWP and the association of the specific downlink BWP with the first uplink BWP.

7. The method of claim 1, wherein in response to detecting the beam failure, the UE does not change an active uplink BWP from the first uplink BWP to a second uplink BWP of the multiple uplink BWPs.

8. The method of claim 1, further comprising:
   before transmitting the BFR request, changing the active downlink BWP of the cell.

9. The method of claim 1, wherein the beam failure is detected based on quality of beam.

10. The method of claim 1, wherein the BFR request is transmitted on Physical Random Access Channel (PRACH) of the cell.

11. A User Equipment (UE), comprising:
    a control circuit;
    a processor installed in the control circuit; and
    a memory installed in the control circuit and operatively coupled to the processor;
    wherein the processor is configured to execute a program code stored in the memory to:
      receive, from a network node, a configuration for configuring multiple uplink bandwidth parts (BWP) and multiple downlink BWPs on a cell, wherein each BWP of the multiple uplink BWPs and the multiple downlink BWPs is associated with a specific numerology;
      detect a beam failure on the cell when a first uplink BWP of the multiple uplink BWPs and a first downlink BWP of the multiple downlink BWPs are active;
      in response to detecting the beam failure, transmit, to the network node, a beam failure recovery (BFR) request on the first uplink BWP, wherein the transmitting comprises indicating, to the network node, information of an active downlink BWP of the cell; and
      receive, from the network node, a response to the BFR request on a specific downlink BWP of the multiple downlink BWPs, wherein the specific downlink BWP is associated with the first uplink BWP and the specific downlink BWP is the active downlink BWP of the cell when receiving the response to the BFR request.

12. The UE of claim 11, wherein the processor is further configured to execute the program code stored in the memory to:
    in response to detecting the beam failure and before transmitting the BFR request, identify a new candidate beam based on downlink reference signals received on the cell.

13. The UE of claim 11, wherein the specific downlink BWP is the first downlink BWP if the first downlink BWP is associated with the first uplink BWP, and the specific downlink BWP is a second downlink BWP if the first downlink BWP is not associated with the first uplink BWP.

14. The UE of claim 11, wherein the processor is further configured to execute the program code stored in the memory to:
    in response to detecting the beam failure, change the active downlink BWP of the cell from the first downlink BWP to a second downlink BWP if the first downlink BWP is not associated with the first uplink BWP.

15. The UE of claim 11, wherein the association of the specific downlink BWP with the first uplink BWP is:
    shared between the network node and the UE before detecting the beam failure; and
    at least one of defined in a specification or configured by the network node.

16. The UE of claim 11, wherein the information of the active downlink BWP is derived based on the transmitting the BFR request on the first uplink BWP and the association of the specific downlink BWP with the first uplink BWP.

17. The UE of claim 11, wherein in response to detecting the beam failure, the UE does not change an active uplink BWP from the first uplink BWP to a second uplink BWP of the multiple uplink BWPs.

18. The UE of claim 11, wherein the processor is further configured to execute the program code stored in the memory to:
   before transmitting the BFR request, change the active downlink BWP of the cell.

19. The UE of claim 11, wherein the beam failure is detected based on quality of beam.

20. The UE of claim 11, wherein the BFR request is transmitted on Physical Random Access Channel (PRACH) of the cell.

* * * * *